United States Patent

[11] 3,588,133

[72] Inventor  Thomas A. Caserta
              3335 Quaker Bridge Road, Trenton, N.J.
              08619
[21] Appl. No. 839,314
[22] Filed     July 7, 1969
[45] Patented  June 28, 1971

[54] COMPOSITE ANNULAR SEALING ELEMENT
     2 Claims, 4 Drawing Figs.
[52] U.S. Cl. .................................................... 277/235R
[51] Int. Cl. .................................................... F16j 15/12
[50] Field of Search ........................................ 277/235,
                                                              227, 214

[56]              References Cited
              UNITED STATES PATENTS
     326,345   9/1885   Taylor ........................ 277/235
   2,884,100   4/1959   McKee ....................... 277/235X
   3,009,722  11/1961   Augustin .................... 277/235X
   3,168,321   2/1965   Glicksman .................. 277/235X Primary Examiner—Robert I. Smith
Attorney—Hyde W. Ballard ABSTRACT: An improved sealing device for attaching threaded fasteners is provided which utilizes an elastomeric laminate of annular configuration which is peripherally retained within a concave relatively rigid annular member.

PATENTED JUN 28 1971　　　　　　　　　　　3,588,133
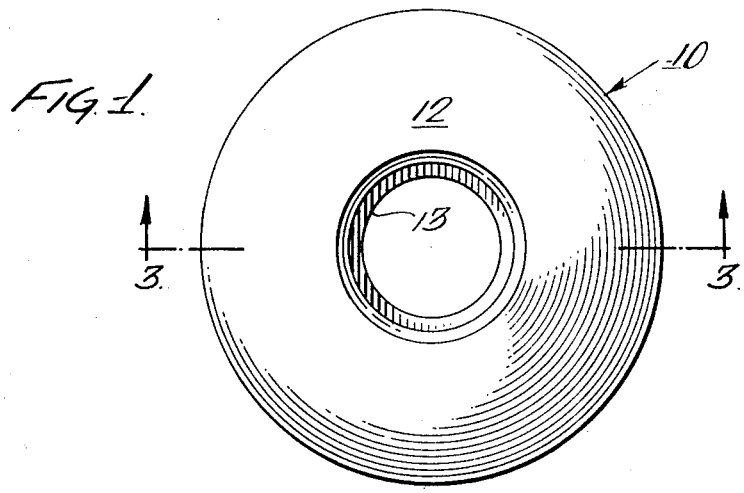
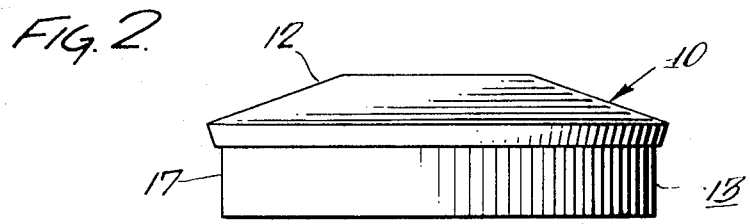
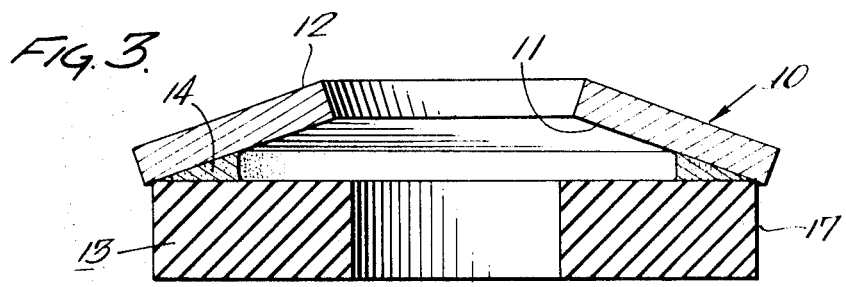
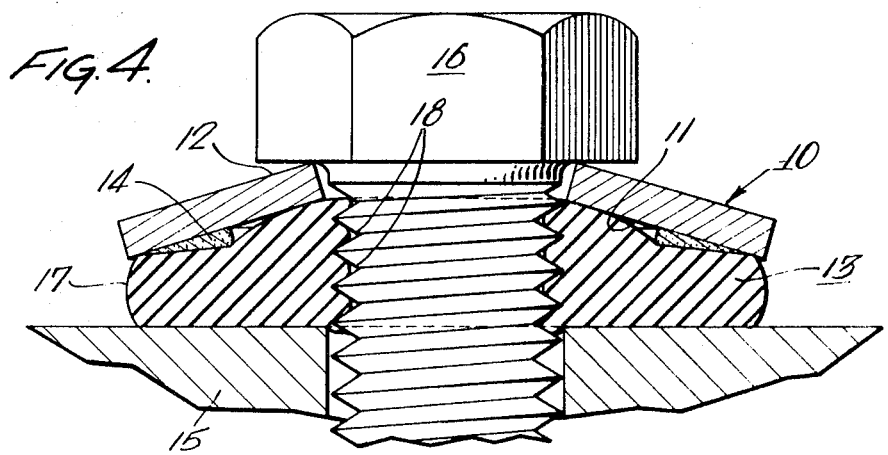
Inventor:
Thomas A. Caserta
by Hyde W. Ballard Atty.

COMPOSITE ANNULAR SEALING ELEMENT

In the construction of sheet metal buildings and other applications where it becomes important to prevent leaking of liquid around the screws which secure the sheet metal to the structural framework, past practices have utilized an ordinary metal washer to which is bonded a resilient rubberlike washer fabricated from an elastomeric material which may be of either synthetic or natural rubber, for example, Neoprene. Hereinafter this portion of the laminated bicomponent washer will be referred to as the "rubber washer" or "rubber portion of the washer." These are manufactured by stamping them out of large sheets which have been previously laminated by bonding a sheet of rubber to a sheet of metal. In practice, sealing washers produced as described above have been found to be quite unsatisfactory. First, the compression pressure necessary to stamp out the washers expands the rubber sheeting so that when the compression is released, the rubber portion of the laminated washer contracts to a diameter substantially less than that of the washer. More important is the fact that the rubber portion of the laminated washer is adhered to the metallic portion throughout its entire surface. This inhibits the ability of the rubber to flow radially inward to provide an adequate seal around the threaded portion of the fastening screw. Also, the shearing action of stamping of these washers leaves ragged edges on the outside edge of the Neoprene washer which hastens disintegration.

The present invention overcomes these difficulties by providing a dished or concave metallic washer to which a rubber washer is adhesively secured but only in a limited peripheral area. The outside diameter rubber portion of the washer can be accurately controlled to be the same as or greater than the outside diameter of the metallic washer. More important, however, when the washer is installed and axial pressure exerted on the apex area of the metallic washer by means of the screwhead, the conical periphery of the metalic washer together with the adhesively secured portion around this periphery acts as a dam to prevent radial outward flow of the rubber during compression. As a consequence, any radial flow of the washer element is inwardly and this forces the rubber into the threads of the connecting screw to provide an extremely tight and satisfactory liquid seal.

Another important advantage of the present invention resides in the ability to plate the periphery of each metallic element of the composite washer prior to the application of the rubber element. This, of course, inhibits corrosion and cannot be done if the washers are stamped from a large sheet due to the inability to plate the washers after the rubber sheet has been attached.

Referring now to the drawings, FIG. 1 is a plan of my improved composite sealing washer, FIG. 2 is a side view of the washer of FIG. 1, FIG. 3 is a section as seen at 3-3 of FIG. 1, and FIG. 4 is an enlarged sectional view showing a washer installed and under compression.

A metallic annular washer 10 is preformed as shown in FIGS. 2 and 3 to provide a concave lower face 11 and an outward convex face 12. The washer 10 is preferably plated or otherwise rustproofed. before or after it has been given the above-described configuration. The sealing portion of the composite washer comprises an annular elastomeric element 13 which is secured to the concave surface 11 of washer 10 only around the peripheral area of the washer 13 by means of a suitable adhesive 14. It will be understood that the use of a concave relatively rigid or metallic washer 10 is preferred since the sealing action is greatly enhanced thereby. However, it will be understood that in some circumstances, it will be possible to obtain adequate sealing by using only a flat washer but maintaining the limited peripheral adhesion between the rubber washer and the metallic washer.

When the improved washer of FIGS. 1-3 is utilized in securing a section 15 of sheet metal or other material, a threaded screw 16 which may be either a machine screw as shown or a sheet metal screw, is turned to apply substantial pressure to the apex of the convex portion 12 of the washer 10. This pressure at the apex compresses the outer periphery 17 of the rubber washer 13 but tends to inhibit or at least restrict outward flow of the rubber washer. This is due to the restricting action of the concave surface 11 of the metallic washer since the periphery of the metallic washer is substantially closer to the element 15 than is the apex 12 of the washer. Additionally, the restraining action exerted by the peripheral bond or adhesive 14 also inhibits radially outward flow of the rubber washer. Acting in conjunction, these restricting factors not only assist in providing a watertight seal in the event that the screw 16 is not threaded all the way. Sufficient inward radial pressure is exerted to force the bore of the rubber washer 13 into the threads 18 of screw 16 so that a very effective weathertight seal is provided.

It will also be understood by those skilled in the art that the bores of the two washers do not have to be the same, and this would be particularly advantageous in the event that the sealing element is used with a nonthreaded fastener such as an ordinary nail. Furthermore, it is within the scope of the present invention to eliminate the bore entirely in the elastomeric element which, of course, would still further increase the radial inward pressure in the event a noncircular fastening device were employed.

Having thus described my invention,

I claim:

1. A composite washer and sealing element for the shank of screw-type fasteners comprising a metallic annular washer member having a bottom concave face and an annular elastomeric expandable member adhesively secured to the concave surface of said washer member only around the outer peripheral top surface thereof, whereby axial compression upon the top surface of the washer member forces the inner unsecured portion of said elastomeric member radially inwardly toward the center thereof.

2. The composite washer and sealing element of claim 1 characterized in that the bottom face of the metallic annular washer member and the top surface of the annular elastomeric expandable member are initially disposed at an angle relative to each other.